United States Patent
Zeman et al.

[11] Patent Number: 5,416,716
[45] Date of Patent: May 16, 1995

[54] CONTOUR BUILDER

[75] Inventors: Zdenek Zeman, Willington; Adriano Baglioni, South Windsor, both of Conn.

[73] Assignee: Gerber Garment Technology, Inc., Tolland, Conn.

[21] Appl. No.: 40,160

[22] Filed: Mar. 30, 1993

[51] Int. Cl.$^6$ .............................................. G06F 15/46
[52] U.S. Cl. ..................... 364/474.29; 318/570
[58] Field of Search ............ 364/474.3, 474.24–474.27, 364/474.29–474.35; 318/568.1–568.25, 569–573

[56] References Cited

U.S. PATENT DOCUMENTS

| | | | |
|---|---|---|---|
| 3,866,179 | 2/1975 | McGee et al. | 364/474.29 X |
| 4,031,369 | 6/1977 | Heaman et al. | 235/151.11 |
| 4,855,927 | 8/1989 | Seki et al. | 364/474.29 |
| 4,870,597 | 9/1989 | Seki et al. | 364/474.29 |
| 4,893,251 | 1/1990 | Seki et al. | 364/474.29 |
| 4,949,270 | 8/1990 | Shima et al. | 364/474.26 |
| 4,959,597 | 9/1990 | Kawamura et al. | 318/568.15 |
| 5,204,599 | 4/1993 | Hohn | 318/571 |
| 5,270,940 | 12/1993 | Shinozaki | 364/474.29 |
| 5,276,383 | 1/1994 | Nishimura et al. | 318/568.15 |

*Primary Examiner*—Roy N. Envall, Jr.
*Assistant Examiner*—Cameron H. Tousi
*Attorney, Agent, or Firm*—McCormick, Paulding & Huber

[57] ABSTRACT

A method of moving a cutter blade along a contour defined by a plurality of segments each connected end to end with one another and having at least one angle disposed between consecutively ordered segments calculates a distance from a corner point along one and another line segments and fits an arc to be followed by the blade between the line segments for eliminating repeated high force short time system inputs and replacing them with lower force longer duration inputs to affect the reduction and mechanical wear and the reduction of shocks to the system. The method further includes a process by which individual velocity profiles are determined for each contour in order to run the system at maximum velocity at all times during the course of a cutting operation.

15 Claims, 6 Drawing Sheets

Figure 1A:
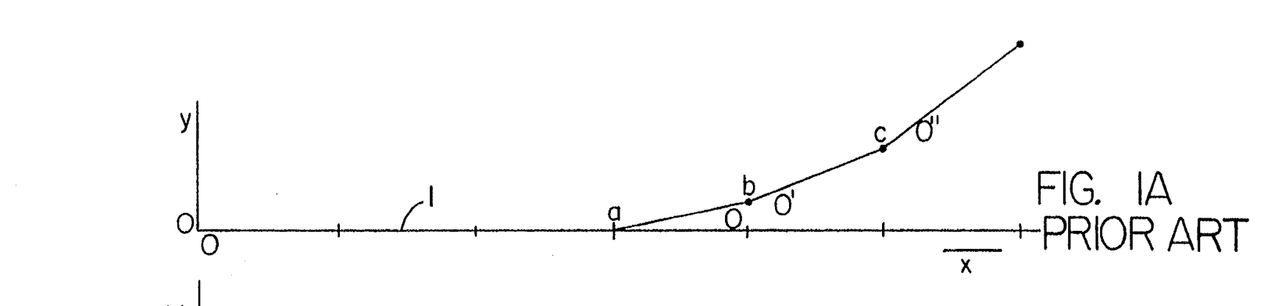
FIGS. 1A through 1E illustrate prior art velocity and acceleration versus time profiles for cutter head movements of the type depicting high force short time system inputs.
Figures 1B, 1C:
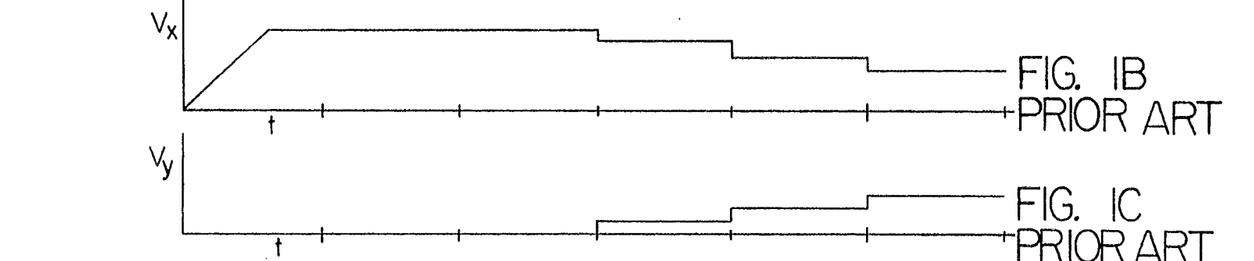
Figure 1D:
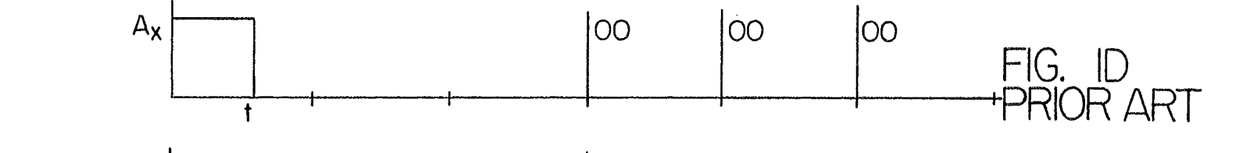
Figure 1E:
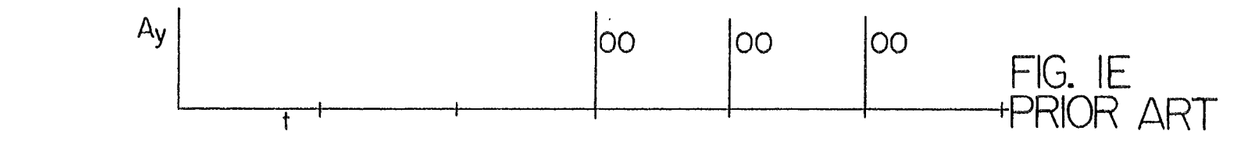

FIG. 6B ically controlled cutting machines, all motion data sent from the controller to the motors which drive the cutter head are composed of straight line movement commands, sent to appropriate drive motors as successive motion commands at uniform intervals spaced milliseconds apart from one another to move the cutting blade along a desired line of cut. These straight line movements are so incrementally small by comparison to the overall pattern path that is to be cut, that in the cutting of a curved path, the collection of these movements take on a curvature characteristic. The segments which make up a contour thus may take the form of straight lines or ones having a given curvature. However, segments of a contour most always contain corners which are made up of two straight lines which have some angle disposed therebetween. When cutting through such a corner, the previously known systems generate instantaneous changes in the directional velocities of the knife. As depicted in FIG. 1A, the line 1 illustrates a cutting path to be followed by a knife edge. The path to be followed tracks directly along the X axis until it reaches point a whereupon a Y velocity component is added to cause the cutter head to turn at the angle theta ($\Theta$). At subsequent points b and c, the cornering angle gets steeper with the addition of another Y vector component to create new angle at point b of $\Theta'$ and another angle $\Theta''$ at point c. As can be seen in FIGS. 1B and 1C, at the point a where the direction changes from an otherwise pure X direction path of travel, the X and Y velocity components change stepwise. That is, up to point a, the $V_y$ velocity component was zero, and at point a, the velocity in the Y direction is increased stepwise a given unit and continues to do so at points b and c coincident with the steeper angles of change. Conversely, as the angle $\Theta$ steepens from an otherwise horizontal path, the $V_x$ component diminishes stepwise. As shown in FIGS. 1D and 1E, X and Y acceleration components show drastic stepwise decreases or increases at points corresponding to where instantaneous changes in the $V_x$ and $V_y$ velocity components occur. The $A_x$ and $A_y$ values at points a, b, and c are perceived by the control system to be extremely large values, and accordingly the position drive motors are correspondingly driven very hard by the controller to meet this perception, thereby resulting in harsh, jerking movements being imparted to the cutter head at each point where a change in a velocity component occurs. This jerking or harsh movement has been found to cause curve overshoot, choppy circles, and overall subjects the cutter machine to mechanical shocks which over time eventually lead to the breakdown of component parts in the system.

CONTOUR BUILDER

CROSS REFERENCE TO RELATED APPLICATION

This application relates to U.S. Ser. No. 08/125,112, entitled "CONTROLLED ZONE VACUUM SYSTEM" filed Sep. 21, 1993 in the name of Gerber Garment Technology, Inc., and assigned commonly with the assignee with the present invention.

BACKGROUND OF THE INVENTION

The present invention relates to a method of cutting sheet material using a cutting apparatus having a cutter head and a reciprocating blade which is caused to move along a path of cut by a pre-programmed set of instructions issued to a drive system by a computer and deals more particularly with an improvement in these instructions wherein the cutter blade is caused to follow a smooth line of cut around a corner defined by a prescribed angle to effect better running of the cutter head and wherein the cutter head is caused to move long a given path of cut always at maximum velocity.

In cutting a pattern piece from a single ply or a number of plies of fabric material a computer controlled cutting machine employs a contour builder which divides a pattern shape into a series of segments designated by beginning and end points connected in succession to define a path of cut around a pattern shape. A contour is a specific collection of such segments of the pattern defined by beginning and ending points corresponding to where the forward motion of the cutting blade is stopped. These stopping points, or breaks, occur because of any number of circumstances which may be part of a cutting operation. Examples of stopping points which are included as part of the cutting operation would be points along the cutting path where the cutter blade is stopped and sharpened by appropriate sharpening means carried by the cutting blade. Another stop point would occur where the cutter blade must turn through an angle, such as a 90 degree turn, and therefore must be stopped and rotated to align the cutting edge with the new line of cut. Thus, a further stopping point would be defined by a change of direction in the path of cut requiring the cutter head where required by programming data, to lift, rotate and subsequentially plunge the cutter blade into the layup material at the newly prescribed angle.

In the past, if a contour had a given turn angle, that is one which that could be negotiated by the cutter blade without stopping and turning, or, lifting, turning and subsequentially plunging, the whole contour nevertheless would be limited by the maximum speed that the cutter blade could pass through the turn. That is, the cutter head, while following a straight line, will be able to run at a greater velocity than the velocity required to cut through a turn thereby limiting the maximum velocity of the cutter head through an entire contour to the velocity of the cutter head at its slowest point in the contour, namely, at the tight corners in the contour.

In such numerically controlled cutting machines, all motion data sent from the controller to the motors which drive the cutter head are composed of straight line movement commands, sent to appropriate drive motors as successive motion commands at uniform intervals spaced milliseconds apart from one another to move the cutting blade along a desired line of cut. These straight line movements are so incremental- Accordingly it is an object of the present invention to provide a method for improving the performance of a cutter head around corners whereby the cutter is moved through a turn with a smoother motion and more accurate control of the knife direction by eliminating the hitherto known problems with the mechanical shocks imparted to the cutter as a result of discontinuities in the velocity components defining the path of travel of the knife.

It is yet another object of the present invention to maximize efficiency in a cutting operation by causing cutting along a contour at maximum velocity up to a tight corner in the contour at which point, the cutting speed slows down to negotiate the corner and thereafter cutting of the remainder of the contour is effected at normal cutting speed.

It is yet a further object of the present invention to reduce mechanical wear in the cutter head by eliminating hard shocks produced by servo motors by substituting a smooth and continuous motion for repeated high force short time system inputs.

SUMMARY OF THE INVENTION

A method for causing a knife blade to cut around a corner defined by a first and a second line segments which define a cutting a path for a cutting blade along a contour causes the knife blade to follow a smooth path of travel through the corner. This is accomplished by creating a first path of travel for the cutting blade extending in a first direction along at least one line segment and creating a second path of travel for a cutting blade extending in a second direction along at least another line segment with each of the one and the another line segments being joined to define an angle therebetween at a corner point. Next, a first point along the one line segment is defined and spaced a given distance from the corner point and a second point is defined along the another line segment spaced the same given distance from the corner point. The first and second points on each of the one and another line segments is a point of tangency for an arc which extends between the one and the another line segments. An acceptable spacing is determined between the corner point and the arc as measured by the point on the arc which exists closest to the corner point. The acceptable spacing value and the angle are used to calculate the position of the first and second points along the one and the another line segments. The knife blade is caused to depart from the first path at the first point along the one line segment so as to cause it to follow the arc extending between the one and the another line segment and thereafter causing the knife blade to move along the second path defined by the another line segment once the knife moves through the arc and arrives at the second point.

The invention further resides in a method of creating a velocity profile for a contour where the contour is defined by a series of segments each continuously connected with one another in an end to end manner by a beginning point and an end point defining a distance therebetween. For each segment, beginning, peak and ending velocities are determined and checked against system parameters. The method prescribes a maximum velocity which is a function of a desired feed rate for each segment and uses the distance of each segment to determine whether the actual attainable peak velocity for that segment will be equal to the prescribed maximum velocity. If this is not the case, then the attainable peak velocity will be used in lieu of the prescribed maximum velocity for the involved segment. The ending velocity for the involved segment is determined by taking the lesser of the peak velocity for the involved segment and the maximum prescribed velocity for the next successive segment while the beginning velocity of the next successive segment is set equal to the ending velocity of the previous segment.

DETAILED DESCRIPTION OF THE PREFERRED EMBODIMENTS

Figure 2:
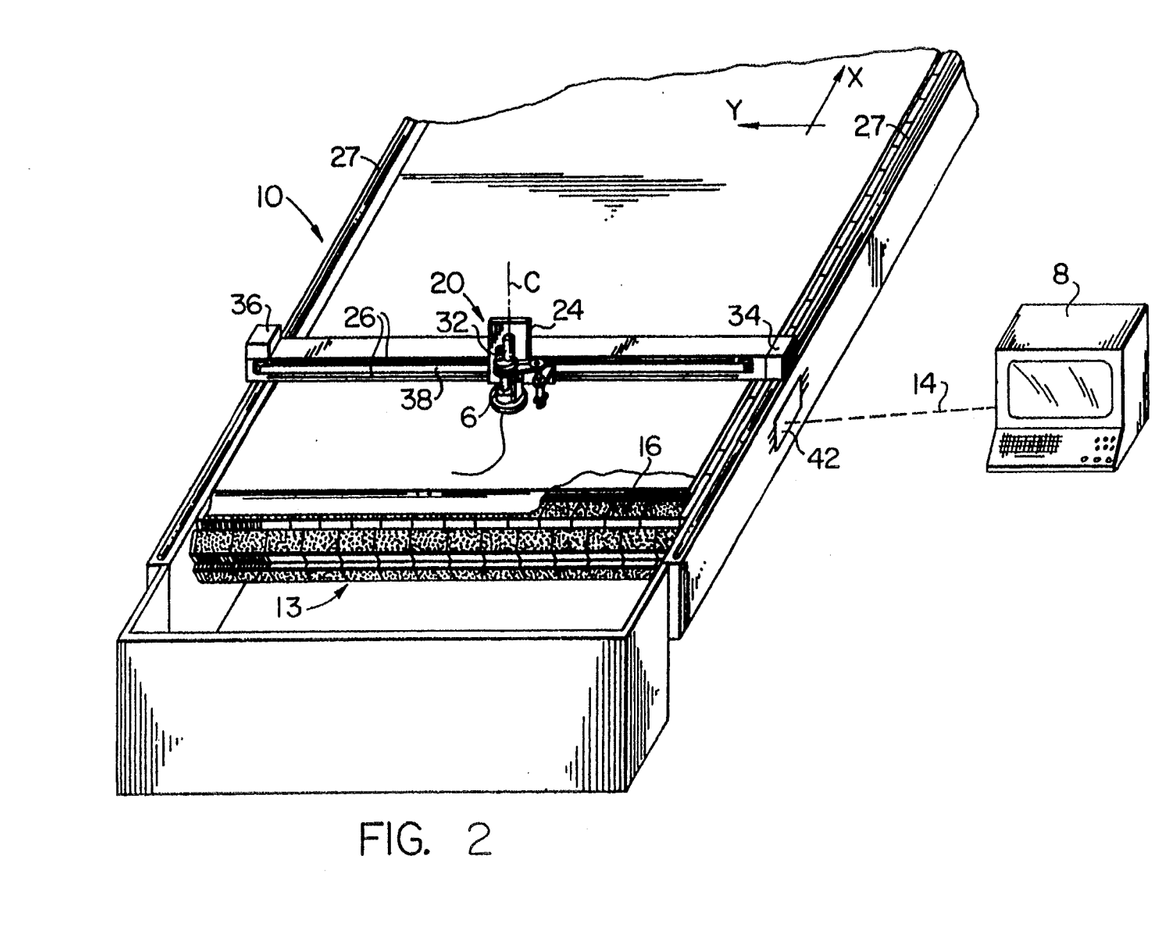
FIG. 2 is a perspective view of a cutting machine of the type in which the present invention may be employed.

FIG. 2 illustrates an automatically controlled cutting machine, generally designated 10 of the type generally known in the industry. The machine 10 is utilized to cut a single ply or a multiply layup of sheet material including woven and non-woven fabrics, leather and material made from synthetics. The machine is numerically controlled, and for this purpose is connected to a numeric controller 8 by means of a cable 14 which transmits signals between the controller and other processors in the machine relating to the shapes of the pattern pieces to be cut. The numeric controller 8 maybe one of any known types of personal computers capable of reading pattern data from an external source or from within its memory and passing it to the other processors maintained in the machine as will be seen with reference to FIG. 3.

The machine 10 is further comprised of a cutter head 20 and a support bed 14 having a permeable support surface 16 which functions to allow a reciprocating blade 6 carried by the cutter head to plunge below the support surface in order to fully cut the material being supported thereon. The cutter bed 14 may be one of a number of different beds which are capable of supporting sheet material in this manner, but in the illustrated embodiment is a conveyorized bed formed from units of bristle blocks trained in a loop about opposite end axes. The cutter head 20 is mounted for movement above the support surface 16 such that it is moveable along first ways 27,27 which extend in the indicated X coordinate direction and is likewise supported for movement in the indicated Y coordinate direction by a y-carriage 24 disposed above the table and moveable along second ways 26,26 to controllably position the cutter head above the support surface. The cutter head blade 6 is reciprocating and is capable of being rotatably controllably positioned about a C-axis extending generally perpendicularly to the plane defined by the support surface 16. Angular movements of the blade about the C-axis are controlled through the intermediary of a theta control motor 32 which is carried on the carriage 24. Movement of the cutter head in the indicated X coordinate direction is accomplished by an x-drive motor 34 while movement of the carriage 24 along the ways 26 is accomplished by a y drive motor 36 which is drivingly connected to the carriage through the intermediary of an endless belt 38. Each of the control motors 32, 34 and 36 is respectively linked to appropriate servo control units to effect positioning of the knife blade along a desired cutter path.

Figure 3:
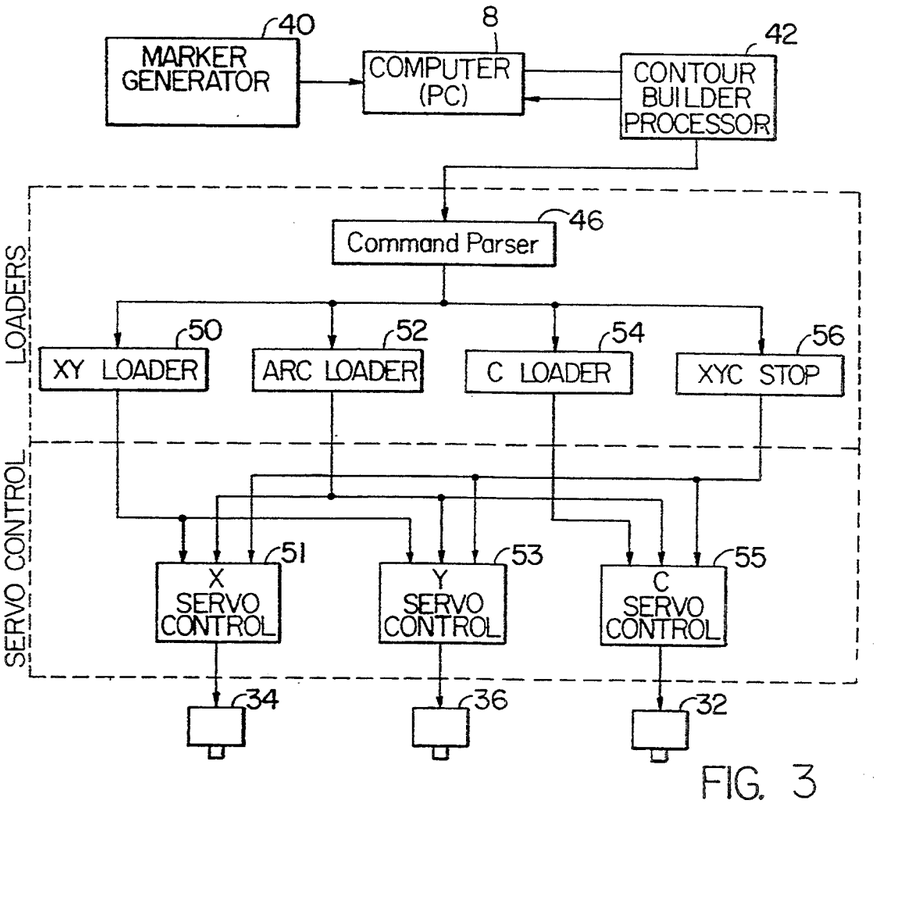
FIG. 3 is a schematic illustrating the control scheme for the contour builder.

Referring now to FIG. 3, and generally to the control scheme for regulating the blade motion relative to the x-,y- and c-axes, it should be seen that this control system is comprised of a marker generator 40 from which originates information on marker shapes and the arrangements of these shapes relative to one another, a contour builder processor 42 for communicating with loaders which drive the x, y and c axes motors and the personal computer 8 which communicates information between the marker generator and the contour builder. Each of the X, Y and C axis motors 34, 36, and 32 is respectively linked to an associated servo unit 51, 53 and 55 which is provided for the accurate positioning of the blade along a desired line of cut. Also provided as part of the contour builder 42 is an xy-loader 50 which generates straight line position commands to respective servo control units 51 and 53, an arc-loader 52 for generating curve line position commands to each of the servo control units, a c-loader 54 for generating position data for c-axis movement to the unit 55, and an xyc-stop loader 56 for generating stop position commands to each unit responsible for x, y and c axes movements. One or more loaders responsible for generating a given movement receive instructions from a command parser 46 which tells designated ones of the separate independent loaders to issue motion control commands to selected ones of the control motors at uniform intervals. Each of the x-, y- and c-loaders is responsible for generating position, velocity and acceleration commands at such intervals while the xyc-stop loader generates a ramping down motion for all stopping movements involved in the velocity profile of the involved contour.

Figure 6A:
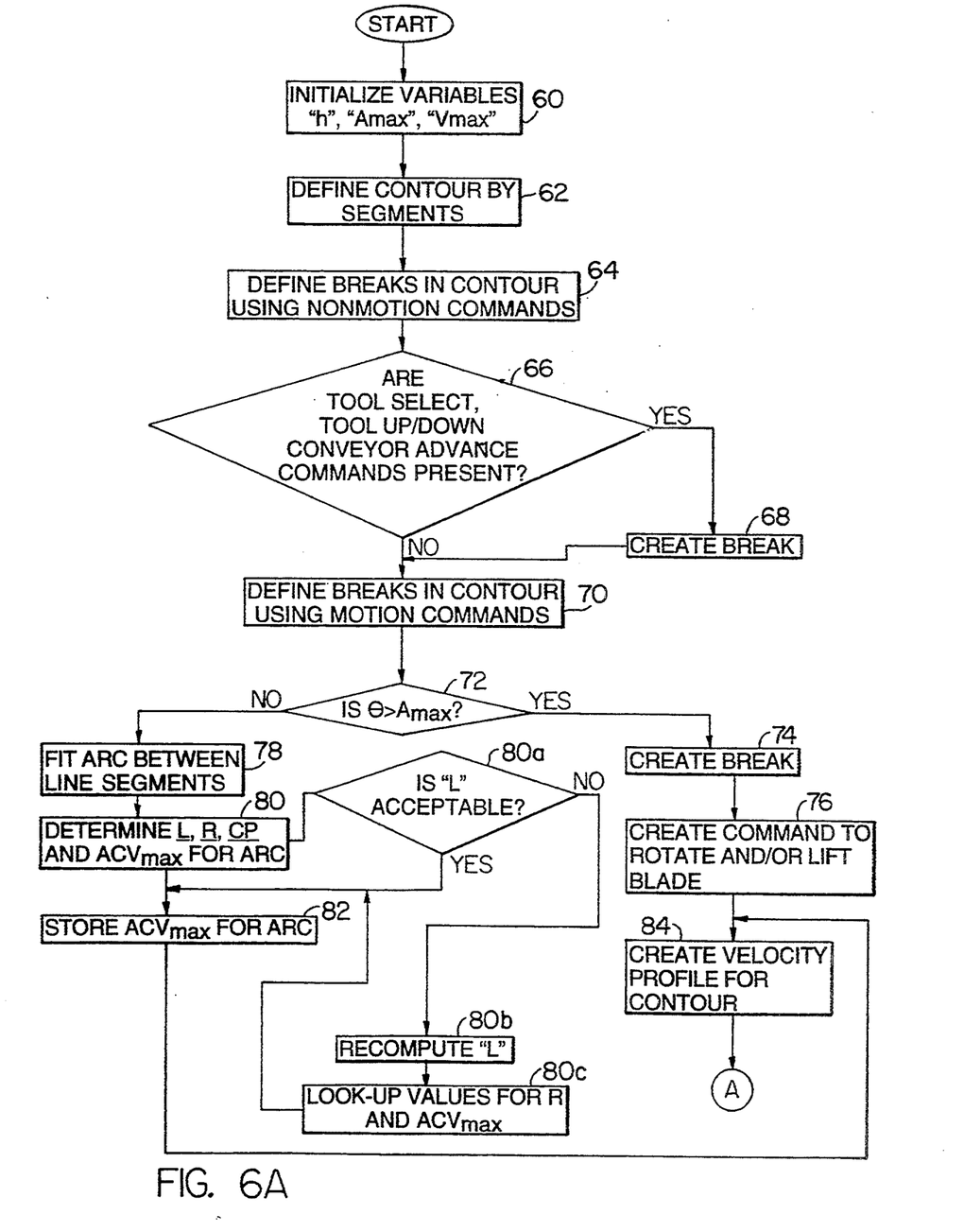
FIG. 6 illustrates in flowchart form the method of the invention.
Figure 6B:
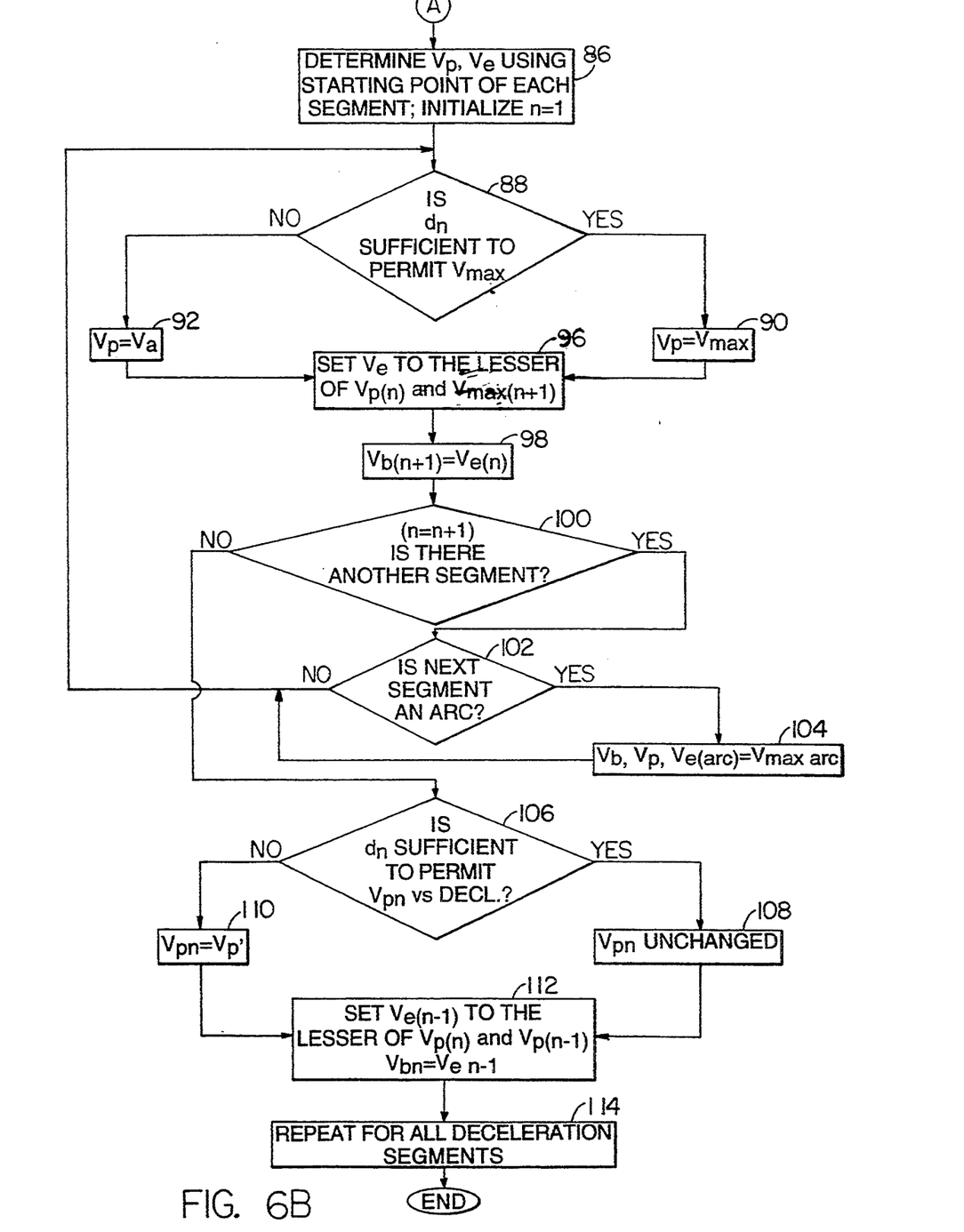

Referring to the flowchart of FIG. 6 and more particularly to the method of the invention, the operation of the contour builder 42 of the preferred embodiment is described as follows. First variables h, $V_{max}$, $A_{max}$ are initialized corresponding respectively to maximum error spacing, a prescribed system maximum velocity and maximum moving turn angle (step 60). Next a given contour is identified by the segments which define it (Step 62). It being noted that these segments are preformed and arrive with the contour when it is downloaded from the personal computer. The beginning and ending points of a contour are called breaks. The program determines whether as within the original contour, additional breaks are needed. This is done by examining all non-motion commands occurring along each segment of the involved contour (Step 64). It does this by looking for instructions, such as tool select, tool up and down, conveyor advance or any other command which would cause the cutter head to stop along a given path in the contour (Step 66). If such a command is found to exist then a break is created at that point along the set of segments (Step 68).

Further breaks in the contour are next determined by examining the motion commands associated with each of the line segments (Step 70). This is done by examining the angle between consecutive line segments and determining whether that angle is greater than the predetermined maximum angle $A_{max}$ to which the system was initialized (Step 72). If the angle existing between two successive line segments is greater than $A_{max}$, then a break is generated at that point (Step 74) and a subsequent initiate command, such, as rotate blade and/or lift and rotate blade and subsequentially plunge command is generated at that point in order to negotiate the corner from a stopped condition (Step 76).

Figure 4:
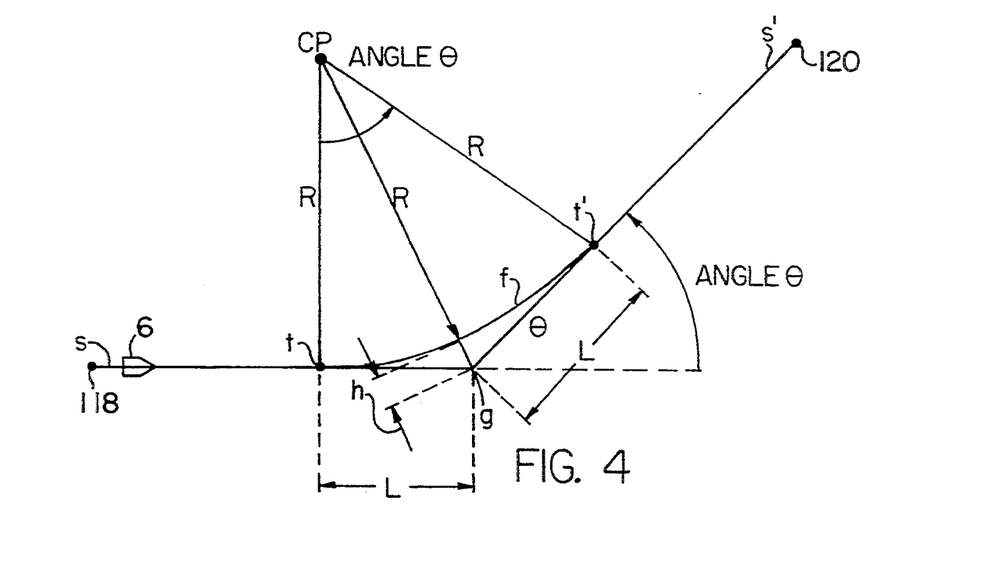
FIG. 4 illustrates the path followed by the cutting blade around a corner in accordance with one aspect of the invention.

As illustrated in FIG. 4, if the angle existing between two successive line segments S,S' is less than or equal to $A_{max}$, then an arc is fitted between the two segments in accordance with one aspect of the invention (Step 78). This arc or fillet as shown by the curved line f which extends tangentially between two points, with each point respectively touching one of the two segments S,S' at tangent points t,t'. For purposes of this discussion, the point t will be referred to as a departure point since it is the point where the cutting blade departs from an otherwise straight line path around the corner g, and the point t' will be referred to as the return point because this is the point where the blade 6 returns to the line segment S' from the curved line path f. These points of tangency t,t' are determined along the contour by calculating a dimension L taken from the corner point g rearwardly toward the first departure point t and forwardly of the corner point g toward the return or second point t'. As can be seen from FIG. 4, the fillet f leaves a gap or spacing indicated by the dimension h as measured from the point along the arc f existing closest to the corner point g. The gap h is in effect an error in the cut angle of the pattern piece, but is set by tolerances acceptable in the industry, which in the preferred embodiment is equal to approximately 0.005 of an inch. The length of the dimension L is determined from the geometry of the points of tangency and the break angle theta (Θ) by the following equation:

$$L = h \left( \frac{1 + \sqrt{\tan\left(\frac{\theta}{2}\right) + 1}}{\tan\left(\frac{\theta}{2}\right)} \right)$$

Once the length L is determined, and knowing the break angle theta (Θ) of the contour, the center point CP and radius R for the arc can be determined. Since these calculations are quite extensive and would otherwise be too complex to be computed at run time, a lookup table is provided in memory and is accessed by the program (step 80) once the angle (Θ) is found to meet the specified parameter. Such a table will list the following data in half angle increments as follows:

TABLE A1

| Angle Degrees | L mils | R mils | Arc length mils | Arc Angles time msec | Max speed ($ACV_{max}$) ips |
|---|---|---|---|---|---|
| 0.5 | 71.5 | 16383.7 | 143.0 | 0.5 | 308.8 |
| . | | | | . | |
| 9.5 | 120.6 | 1451.9 | 240.7 | 8.8 | 27.4 |
| . | | | | | |
| $A_{max}$ | | | | | |

As seen from the above, data which makes up this table includes a maximum arc velocity ($ACV_{max}$) in inches per second which is maintained by the cutter head as it moves through the arc. The maximum velocity for a given angle is emperically determined as a function of the dynamic loading capacity of the cutter head as it is moved through the fillet f. In order to insure that the arc fits between the involved segments, S,S', the value of the dimension L is checked to insure that it is less than the length of segment S and is less than one half the length of segment S' (Step 80a). If the L value meets this parameter, then it is used and all data associated with it on the same line in Table A1 is likewise used in further computations. If however the L value does not meet this parameter, then L is set to the lesser of the length of segment S and one half the length of segment S' (Step 80b). Using the newly calculated value for L, radius R and $ACV_{max}$ for the arc are determined by referencing values in Table A1 which are listed on the same line with newly calculated L. Once determined, $ACV_{max}$ for the segment is saved for future reference (Step 82) with respect to the buliding of velocity profiles for the contour.

Figure 5:
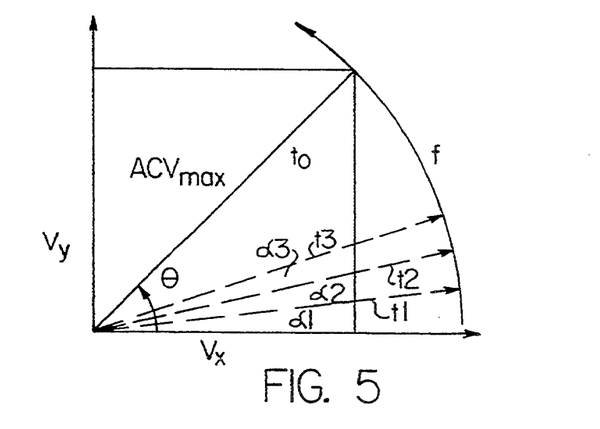
FIG. 5 illustrates the velocity components of the blade as it follows a created arc around a corner.

It should be appreciated with reference to FIG. 5 that the maximum velocity value $ACV_{max}$ set forth in the above, is in essence the addition of two vector quantities namely $V_y$ and $V_x$. The $V_y$ vector quantity is defined by the expression $V_y = (ACVmax)(sine\ \alpha)$ and the Vx vector quantity is defined by the expression $V_y = (ACVmax)(cosine\ \alpha);$ wherein alpha ($\alpha$) is equal to ($\omega$)(t) and $\omega$ is the prescribed angular velocity for the turn and the value t is the interval (t1, t2, t3 . . .) at which new motion commands are sent to the positioning motors to move the cutter head through the arc f, which in the preferred embodiment, are spaced one millisecond apart. The value of alpha ($\alpha$) changes as a function of t until the last interval $t_{73}$ occurs, at which time the value of alpha ($\alpha$) is equal to that of theta ($\Theta$). Thus, it should be appreciated that from point t to point t' there exists no repeated high force short time system inputs, but rather lower force longer duration inputs as function of sign and cosine curves. This therefore eliminates the harsh jerky shocks imparted to the system by the servo motors which are responding to the otherwise stepwise changes in vector component directions. It being noted that at each interval the leading edge of the knife is still moved in straight line increments, but these increments are so small as too cause the blade to take on the appearance of its being moved along a curved path, aided in this regard by the momentum of the cutter head.

Figure 7A:
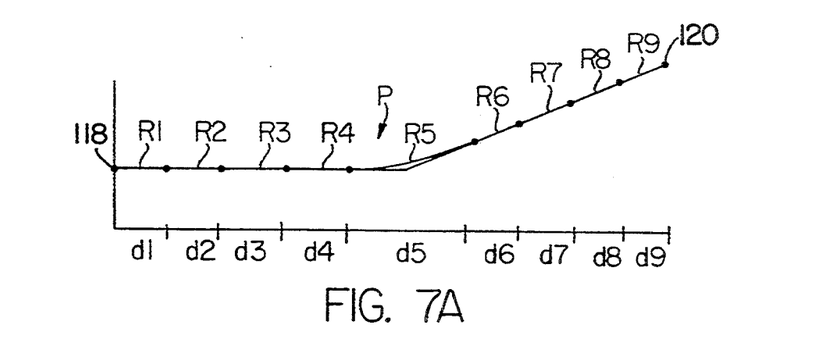
FIGS. 7a and 7b show respectively a contour and its velocity profile.

Following the creation of arc and/or breaks in the contour, a velocity profile for each contour is then created based on the collection of segments which make up the contour (step 84). This process is controlled by two sequences of steps which together create the ramping and down-ramping, and, if applicable, intermediate plateau portions of the profile which are acceptable to system parameters. As illustrated in FIG. 7a, the path P of the contour is of course defined by a series of segments, $R_1$, $R_2$, $R_3$, $R_4$, $R_5$, $R_6$ . . . $R_9$, beginning at point 118 and ending at point 120 with the segment $R_5$ being an arc calculated in accordance with the steps 78, 80 and 82 above. For each segment of a contour, a beginning velocity $V_b$, a peak velocity $V_p$ and an ending velocity $V_e$ are each determined. The beginning and peak velocities are calculated by a first sequence of steps which analyze each segment from its starting point, which in the example FIG. 7a, are the leftmost points of each segment (step 86). This is accomplished by determining whether the distance $d_n$ defining each straight segment length is sufficiently long to permit the initialized maximum velocity ($V_{max}$) to be achieved without imposing an acceleration in excess of that set for the system, assuming that acceleration occurs throughout each segment (step 88). This prescribed maximum velocity value $V_{max}$ will be the same for all straight line segments, but will be different for knife movements around very tight arcs or fillets because the velocities around these points will need to be far below the feed rate set for the system.

At segment $R_1$, the beginning velocity $V_b$ at point 118 of this segment will be zero because it is the start of a contour. The peak velocity for this segment will be either equal to Vmax (step 90) or, in the case where Vmax is not attainable due to the insufficiency in the length of the segment, then peak velocity $V_p$ will be the maximum attainable velocity $V_a$ of the knife based on the acceleration limitation for the system (Step 92). In the illustrated example of FIGS. 7a and 7b, maximum velocity is not obtained through segment $R_1$, and therefore peak velocity $V_p$ in this case will be equal to the maximum attainable velocity $V_a$ of that segment rather than Vmax. Ending velocity for the involved segment is next determined. This is done by setting the ending velocity $V_e$ equal to the lesser of the maximum obtainable velocity $V_p$ of the current segment and the next theoretical maximum velocity $V_{max}$ of the next segment (Step 96). For the next successive segment indicated as $R_2$, the beginning velocity $V_b$ is set equal to the ending velocity $V_e$ of the previous segment $R_1$ (step 98). The same process is carried out for each remaining segments of the contour (step 100). Note that if the segment addressed is an arc as created in steps 78–82, then the values of $V_b$, $V_p$ and $V_e$ for that segment will be determined in the same manner as described with reference to straight line segments, with one exception. This is that for purposes of determining $V_p$, the system will use the lesser of the system ($V_{max}$) and the arc ($ACV_{max}$) maximum velocity values.

Figure 7B:
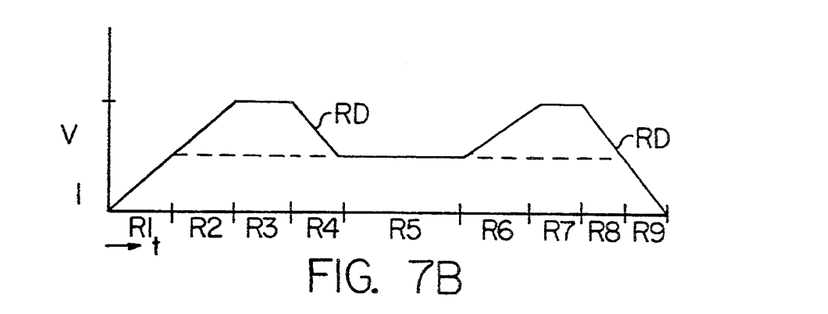

In the second sequence of steps, the ramp down velocities, indicated in FIG. 7b as RD, are checked against acceptable system deceleration parameters and, if necessary, recalculated for each segment. Here the process is in effect reversed from the method followed in the first sequence. That is, the series of segments defining the path P of the contour are analyzed from each end point, which in the case of FIG. 7a are the points which are rightmost justified to each segment. For this purpose, the end point 120, of the segment $R_9$ is used as the starting point for this process. Again the system knows $V_e$ will be equal to zero at point 120 since it is the end of a contour, and determines whether $V_p$ for the segment $R_9$ is acceptable to cause the cutting blade to decelerate to zero velocity along the distance $d_9$ without presenting unacceptable deceleration forces to the system (step 106). If this velocity is acceptable, then $V_p$ as determined by the first sequence will be used for the contour (step 108), but if this is not the case, then the peak velocity $V_p$ for this segment is dropped to allow deceleration to take place at an acceptable rate and this new value $V_p{'}$ will become the peak velocity for the involved segment (step 110). The ending velocity $V_e$ of the preceding segment, in this case segment $R_8$, is then set to the lesser of either that segment's peak velocity $V_p$ and the peak velocity ($V_p{'}$ or $V_p$) of the subsequent segment $R_9$, and, the beginning velocity $V_b$ of that subsequent segment is set to the ending velocity $V_e$ of the preceding segment (steps 112). This process is repeated for all deceleration segments, which in the illustrated example would include segments $R_4$, $R_8$ and $R_9$. The overall result of this process, as illustrated in FIG. 7b, is the creation of a ramp-up, ramp-down velocity profile which maximizes velocity along straight line paths and runs at a lesser velocity around corners while ramping back up to maximum velocity once corners have been negotiated. This is a departure from the previously known way of moving a knife through a contour wherein as illustrated in dotted line in FIG. 7b maximum velocity for the entire contour was limited to the lesser velocity needed to negotiate a corner.

By the foregoing a method for cutting sheet material using controlled data which maximizes velocity and reduces impact loading to the cutter head has been disclosed by way of illustration. Numerous substitutions and modifications can be made to the process without departing from the spirit of the invention. It should also be understood that contiguous contours will vary in accordance with other factors, such as type of material being cut and its cutting characteristics, the type of cutting tool being utilized and the cutting characteristics of the tool including its sharpness, rate of reciprocation based on movements relative to the sheet material and dimensions. The described two cutting techniques may be used singly or in combination with one another. Accordingly, the present invention has been described by way of illustration rather than limitation.

We claim:

1. A method of cutting around a corner having a given angle defined by one and another line segments which define a cutting path for a cutting blade, said method comprising the steps of:

creating a first path of travel for a cutting blade extending in a first direction along at least one line segment;

creating a second path of travel for a cutting blade extending in a second direction along at least another line segment each of said one and the another line segments being joined to define an angle therebetween at a corner point;

defining a first point along the one line segment spaced a given distance from the corner point and defining a second point along the another line segment spaced the same given distance from the corner point such that each first and second point is a point of tangency for an arc which extends between the one and the another line segments;

spacing said arc from the corner point as measured by the point on the arc which exists closest to the corner point by an acceptable spacing;

said acceptable spacing and said angle disposed between the one and the another line segments being used to calculate the given distance of said first and second points along the one and the another line segments;

said one and said another line segments making up part of a contour having a beginning point and an ending point;

defining said contour by points along a cutting path of the knife where forward motion of the knife is stopped;

determining whether the angle created between said one and the another line segments exceeds a prescribed maximum angle for cutting;

creating a break in the contour if said angle exceeds the predetermined angle;

creating said arc between the one the another line segments if the angle between the segments is less than the maximum prescribed angle;

assigning values describing arc maximum velocity, arc radius and center, and distance from said corner point to each of said first and second points based on the angle existing between the one and the another segments;

checking to insure that said arc fits along the one and the another line segments by determining that the distance between the first and second points is less than the length of the one segment and is less than one half the length of the another segment, and using the values assigned for that distance if the distance is deemed acceptable;

recalculating the distance between the first and second points by setting the distance value to the lesser of the length of the one segment and one half the length of the another segment and using the newly calculated distance value to determine arc geometric information and arc maximum velocity; and causing said knife blade to depart from said first path at said first point along said one line segment so as to cause it to follow the arc extending between the one and the another line segment and thereafter causing said knife blade to move along said second path defined by said another line segment once the knife moves through said arc and arrives at said second point.

2. A method as defined in claim 1 further characterized by causing said knife to move through said arc at a velocity which is limited by the angle between the one and the another line segments and the spacing existing between the arc and the corner point.

3. A method as defined in claim 2 further characterized by calculating a center curvature and a radius of curvature for said arc using the distance from the corner point to said first and second points;

and causing said knife blade to move through said arc by driving it at a constant angular velocity through the arc.

4. A method as defined in claim 3 further characterized by determining said spacing as an acceptable error taken from industry standard.

5. A method as defined in claim 1 further characterized by said distances from said corner point being related to said angle by the following equation:

$$L = h \left( \frac{1 + \sqrt{\tan\left(\frac{\theta}{2}\right) + 1}}{\tan\left(\frac{\theta}{2}\right)} \right)$$

wherein L is equal to said distance from said corner point.

6. A method as defined in claim 5 further characterized by causing said knife to move through said arc at a velocity which is limited by the angle between the one and the another line segments and the spacing existing between the arc and the corner point.

7. A method as defined in claim 6 further characterized by calculating a center curvature and a radius of curvature for said arc using the distance from said corner point to said first and second points;

and causing said knife blade to move through said arc by driving it at a constant angular velocity through the arc.

8. A method of creating a velocity profile for a contour for use in the cutting of sheet material along a given path prescribed by said contour, said method comprising:

defining a contour by a series of segments each continuously connected with one another by a beginning point and an end point defining a distance therebetween;

assigning for each segment beginning, peak and ending velocities;

prescribing a maximum velocity for each segment;

determining using the distance of each segment whether the attainable peak velocity will be equal to the prescribed maximum velocity for the designated segment, and substituting for the maximum prescribed velocity the actual attainable peak velocity for the involved segment;

determining an ending velocity for the involved segment by setting the ending velocity for that segment equal to the lesser of the peak velocity for that segment and the maximum prescribed velocity for the next successive segment;

setting the beginning velocity of the next successive segment to equal the ending velocity of the previous segment; and using the velocity profile determined for a given segment to drive a cutting tool along the segment for which a the velocity profile or portion thereof is created.

9. A method as defined in claim 8 further characterized by the step of determining whether the maximum attainable peak velocity is equal to the prescribed maximum velocity further includes the step of setting peak velocity to be equal to the prescribed maximum velocity if the distance of the segment is sufficient to allow the prescribed maximum velocity to be attained and setting the peak velocity to equal the actual attainable velocity if the distance of the segment is insufficient to permit the prescribed maximum velocity to be carried out; and wherein the determination of whether maximum attainable velocity can be achieved is based on acceptable acceleration produced by moving through the distance of the involved segment.

10. A method as defined in claim 9 further characterized by the step of determining the segment peak velocity being defined by the step of determining whether the segment is an arc or a straight line.

11. A method as defined in claim 10 further characterized by the step of providing a prescribed system maximum velocity and a prescribed local arc maximum velocity for an arc segment and using the lesser of the two maximum velocities for the peak velocity of the arc segment.

12. A method as defined in claim 11 further characterized by determining whether the beginning, peak and ending velocities for each segment exceed a system maximum deceleration parameter by starting with the end point of the last segment of the contour and determining whether the determined value for peak velocity is through that segment is acceptable by determining whether decelerations created from peak velocity to zero velocity are acccetable; and recalculating peak velocity for the last segment to be within a value which generates an acceptable deceleration and substituting the recalculated peak velocity for the involved segment if the previously determined peak velocity is unacceptable.

13. A method as defined in claim 12 further characterized by setting the ending velocity of a preceding segment to the lesser of the preceding segments predetermined maximum velocity and the determined peak velocity of the subsequent segment taken in order of motion.

14. A method of cutting around a corner having a given angle defined by one and another line segments which define a cutting path for a cutting blade, said method comprising the steps of:

creating a first path of travel for a cutting blade extending in a first direction along at least one line segment;

creating a second path of travel for a cutting blade extending in a second direction along at least another line segment each of said one and the another line segments being joined to define an angle therebetween at a corner point;

defining a first point along the one line segment spaced a given distance from the corner point and defining a second point along the another line segment spaced the same given distance from the corner point such that each first and second point is a point of tangency for an arc which extends between the one and the another line segments and is spaced by an acceptable spacing from said corner point as measured by the point on the arc which exists closest to the corner point;

said acceptable spacing and said angle disposed between the one and the another line segments being used to calculate the given distance of said first and second points along the one and the another line segments;

causing said knife blade to depart from said first path at said first point along said one line segment so as to cause it to follow the arc extending between the one and the another line segment and thereafter causing said knife blade to move along said second path defined by said another line segment once the knife moves through said arc and arrives at said second point;

defining a contour by a series of one and another segments not necessarily connected with a given angle extending therebetween but each continuously connected with one another by a beginning point and an end point defining a distance therebetween;

assigning for each segment beginning, peak and ending velocities;

prescribing a maximum velocity for each segment;

determining using the distance of each segment whether an attainable peak velocity will be equal to the prescribed maximum velocity for the designated segment, and substituting for the maximum prescribed velocity the actual attainable peak velocity for the involved segment;

determining an ending velocity for the one segment by setting the ending velocity for that segment equal to the lesser of the peak velocity for the one segment and the maximum prescribed velocity for the another segment; and setting the beginning velocity of the another segment to equal the ending velocity of the one segment.

15. A method of cutting around a corner having a given angle defined by one and another line segments which define a cutting path for a cutting blade, said method comprising the steps of:

creating a first path of travel for a cutting blade extending in a first direction along at least one line segment;

creating a second path of travel for a cutting blade extending in a second direction along at least another line segment each of said one and the another line segments being joined to define an angle therebetween at a corner point;

defining a first point along the one line segment spaced a given distance from the corner point and defining a second point along the another line segment spaced the same given distance from the corner point such that each first and second point is a point of tangency for an arc which extends between the one and the another line segments and is spaced by an acceptable spacing from the corner point as measured by the point on the arc which exists closest to the corner point;

said acceptable spacing and said angle disposed between the one and the another line segments being used to calculate the given distance of said first and second points along the one and the another line segments;

said one and said another line segments making up part of a contour having a beginning point and an ending point;

defining said contour by points along a cutting path of the knife where forward motion of the knife is stopped;

determining whether the angle created between said one and the another line segments exceeds a prescribed maximum angle for cutting;

creating a break in the contour if said angle exceeds the predetermined angle;

creating said arc between the one the another line segments if the angle between the segments is less than the maximum prescribed angle; and assigning values describing arc maximum velocity, arc radius and center, and distance from said corner point to each of said first and second points based on the angle existing between the one and the another segments; said given distances from said corner point being related to said angle by the following equation:

$$L = h \left( \frac{1 + \sqrt{\tan\left(\frac{\theta}{2}\right) + 1}}{\tan\left(\frac{\theta}{2}\right)} \right)$$

wherein L is equal to said given distance from said corner point; and causing said knife blade to depart from said first path at said first point along said one line segment so as to cause it to follow the arc extending between the one and the another line segment and thereafter causing said knife blade to move along said second path defined by said another line segment once the knife moves through said arc and arrives at said second point.

* * * * *